United States Patent [19]

Sekimura

[11] Patent Number: 4,505,547
[45] Date of Patent: Mar. 19, 1985

[54] LIQUID CRYSTAL DISPLAY DEVICE WITH REFLECTION PREVENTIVE FUNCTION

[75] Inventor: Nobuyuki Sekimura, Kawasaki, Japan

[73] Assignee: Canon Kabushiki Kaisha, Tokyo, Japan

[21] Appl. No.: 298,468

[22] Filed: Sep. 1, 1981

[30] Foreign Application Priority Data

Sep. 9, 1980 [JP] Japan ................................ 55-125087
Sep. 10, 1980 [JP] Japan ................................ 55-125501
Sep. 10, 1980 [JP] Japan ................................ 55-125496
Sep. 10, 1980 [JP] Japan ................................ 55-125497
Sep. 10, 1980 [JP] Japan ................................ 55-125498
Sep. 10, 1980 [JP] Japan ................................ 55-125499
Sep. 10, 1980 [JP] Japan ................................ 55-125500

[51] Int. Cl.³ .............................................. G02F 1/13
[52] U.S. Cl. ................................. 350/339 R; 350/336
[58] Field of Search .................... 350/338, 339 R, 336

[56] References Cited

U.S. PATENT DOCUMENTS

| 3,736,047 | 5/1973 | Gelber et al. ................ 350/339 R X |
| 3,910,681 | 10/1975 | Elliott et al. ........................ 350/338 |
| 4,185,894 | 1/1980 | Hilton et al. ........................ 350/338 |
| 4,248,502 | 2/1981 | Bechteler et al. ........... 350/339 R X |
| 4,422,730 | 12/1983 | Kozaki et al. .................... 350/338 X |

FOREIGN PATENT DOCUMENTS

| 30117 | 3/1981 | Japan ................................. 350/336 |
| 1428700 | 3/1976 | United Kingdom ............ 350/339 R |

*Primary Examiner*—John K. Corbin
*Assistant Examiner*—Richard Gallivan
*Attorney, Agent, or Firm*—Fitzpatrick, Cella, Harper & Scinto

[57] ABSTRACT

A liquid crystal device is composed of a liquid crystal layer sandwiched between electrode plates at least one of which is composed of a transparent substrate, a transparent electrode provided thereon, and a dielectric layer provided on said transparent electrode and having such a refractive index and a thickness as to reduce the light reflected by said transparent electrode.

7 Claims, 16 Drawing Figures

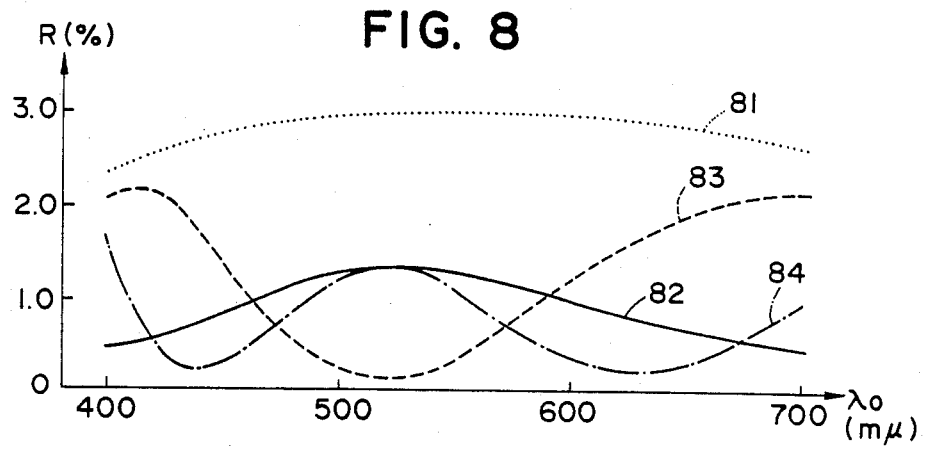
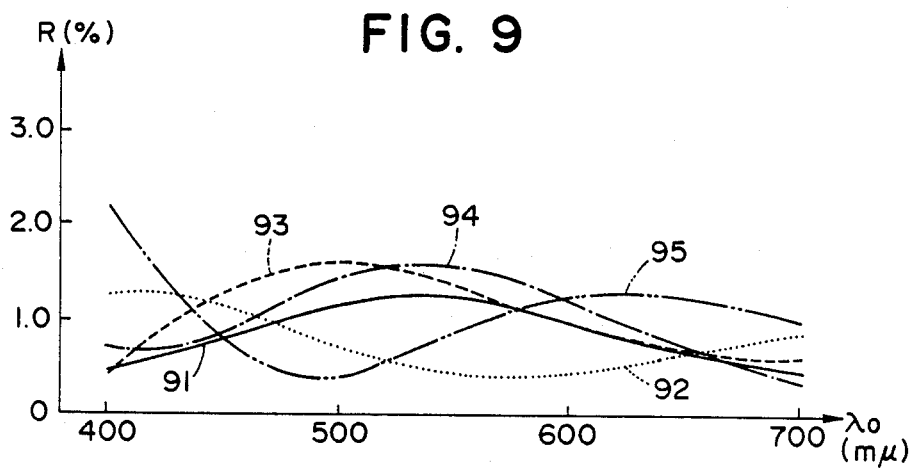
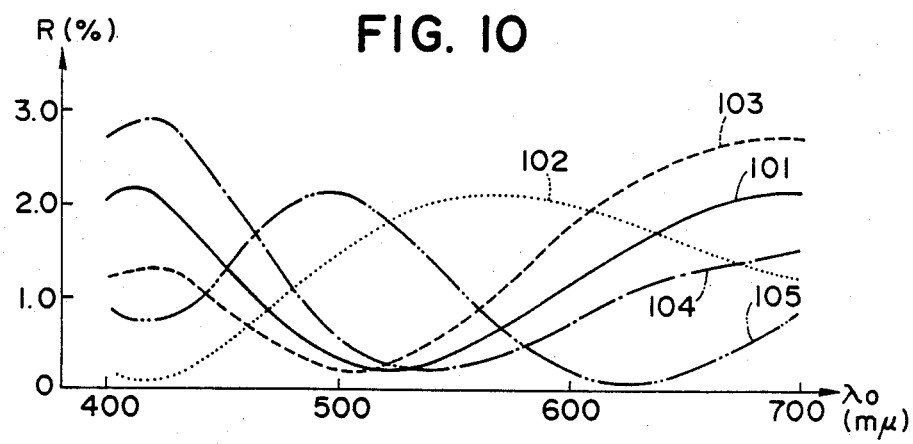

LIQUID CRYSTAL DISPLAY DEVICE WITH REFLECTION PREVENTIVE FUNCTION

BACKGROUND OF THE INVENTION

1. Field of Invention

The present invention relates to an improvement in liquid crystal devices such as, for example, display devices.

2. Description of the Prior Art

There are already known various display methods using liquid crystal such as the dynamic scattering mode, twisted nematic mode, quest-host mode etc., all of which are achieved by applying a voltage across a pair of electrodes sandwiching the liquid crystal material therebetween.

In any method, at least one of the electrodes has to be transparent, and such transparent electrode produces strong patternwise reflection of the incident light because of a high refractive index of the material constituting the transparent electrode, thus significantly deteriorating the image quality and contrast of the liquid crystal display device. Also a strong reflection may cause the user to mistake the device as being in a functional state even when it is switched off.

SUMMARY OF THE INVENTION

The object of the present invention is to provide a liquid crystal device, such as a display, capable of reducing the undesirable light reflected by the transparent electrode in the manner as explained in the foregoing.

The foregoing object can be achieved according to the present invention by a liquid crystal device comprising a liquid crystal layer sandwiched between two electrode plates, at least one of which, usually the one positioned closer to the observer, is provided with a transparent substrate, a transparent electrode provided thereon, and a thin dielectric layer provided on said transparent electrode and having such a thickness and a refractive index as to principally eliminate the light reflected at the interface between the transparent substrate and the transparent electrode.

In the liquid crystal display device of the present invention, the relationships among the refractive indexes $n_0$, $n_1$, $n_2$ and $n_{LC}$ respectively of the transparent substrate, transparent electrode, thin dielectric layer and liquid crystal can be represented by:

$n_0 < n_1$, $n_2 < n_1$, $n_2 > n_{LC}$ as a first case, or by $n_0 < n_1$, $n_2 < n_1$, $n_2 \leq n_{LC}$ as a second case.

Letting $n_1 d_1$ and $n_2 d_2$ represent the optical thicknesses respectively of the above-mentioned transparent electrode and dielectric layer, satisfactory reflection prevention is achieved in the above-mentioned first case if the refractive indexes are selected to satisfy the following conditions:

$$0.1 \times (2N_1-1)\lambda \leq n_1 d_1 \leq 0.15 \times (2N_1-1)\lambda$$

$$0.26 \times (2N_2-1) n_2 d_2 0.39 \times (2N_2-1)\lambda$$

or, $$0.2 \times (2N_1-1)\lambda \leq n_1 d_1 \leq 0.3 \times (2N_1-1)\lambda$$

$$0.2 \times (2N_2-1)\lambda \leq n_2 d_2 \leq 0.3 \times (2N_2-1)\lambda$$

or, $$0.4 \times N_1 \lambda \leq n_1 d_1 \leq 0.6 \times N_1 \lambda$$

$$0.2 \times N_2 \lambda \leq n_2 d_2 \leq 0.3 \times N_2 \lambda$$

or, $$0.1 \times (2N_1-1)\lambda \leq n_1 d_1 \leq 0.15 \times (2N_1-1)\lambda$$

$$0.4 \times N_2 \lambda \leq n_2 d_2 0.6 \times N_2 \lambda$$

wherein $N_1$ and $N_2$ are arbitrary positive integers, and $\lambda$ is a determined design wavelength.

Also in the aforementioned second case, satisfactory reflection prevention can be achieved by satisfying the conditions:

$$n_1 d_1 = (2N_1-1) \times \lambda/4$$

$$n_2 d_2 = N_2 \times \lambda/2$$

or, $$n_1 d_1 = N_1 \times \lambda/4$$

$$n_2 d_2 = N_2 \times \lambda/4$$

or, $$n_1 d_1 = \lambda/8$$

$$n_2 d_2 = N_2/2 \times \lambda$$

wherein $N_1$ and $N_2$ are arbitrary positive integers, and $\lambda$ is the design wavelength.

Also in the liquid crystal device of the present invention it is possible to subject said dielectric layer, on a face thereof contacting the liquid crystal, to a treatment for orienting the liquid crystal, without affecting the reflection preventing function of said dielectric layer.

BRIEF DESCRIPTION OF THE DRAWINGS

FIGS. 8 to 11 are spectral reflectance charts in the visible wavelength region of electrode plates embodying a third case of the present invention;

DESCRIPTION OF THE PREFERRED EMBODIMENTS

Figure 1:
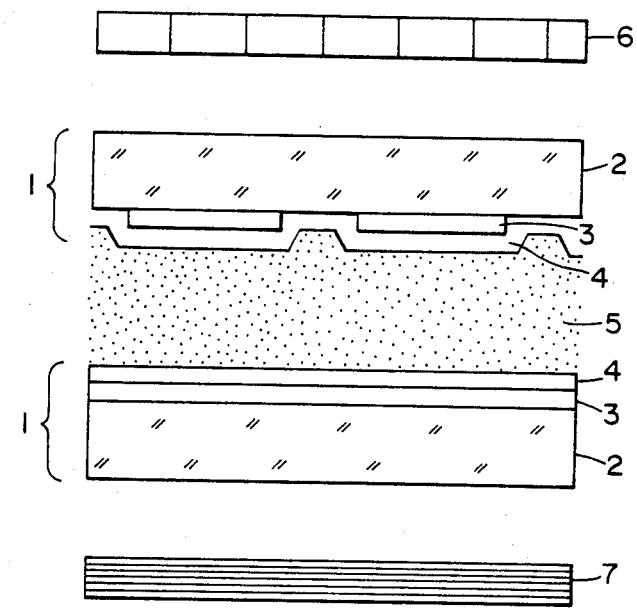
FIG. 1 is a schematic cross-sectional view of an embodiment of the liquid crystal device of the present invention.

FIG. 1 shows, as a cross-sectional view, a liquid crystal device of the present invention, such as a display, utilizing the twisted nematic mode, wherein two electrode plates 1 in accordance with the present invention each comprise a transparent substrate 2, one or more transparent electrodes 3 provided on said substrate, and a thin dielectric layer 4 provided thereon for reducing undesirable light reflection at the interface between said transparent substrate 2 and transparent electrodes 3. A liquid crystal layer 5 is sandwiched between the two such electrode plates, and two linear polarizing plates 6, 7 are positioned outside the above-mentioned structure in such a manner that the polarizing axes of said polarizing plates are mutually perpendicular. The thin dielectric layer for preventing reflection is provided on both electrode plates in the embodiment shown in FIG. 1, but may also be provided on either one of the electrode plates to reduce reflection from the transparent electrode in comparison with conventional display devices.

Figure 2:
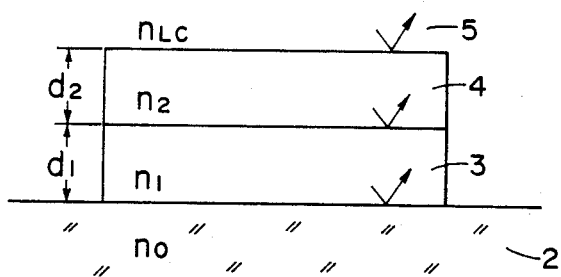
FIG. 2 is a schematic view showing the structure of the electrode plate to be employed in the liquid crystal display device of the present invention.

FIG. 2 shows the structure of an electrode plate shown in FIG. 1, wherein $n_0$, $n_1$, $n_2$ and $n_{LC}$ are refractive indexes respectively of the transparent substrate 2, transparent electrode 3, thin dielectric layer 4 and liquid crystal, and $d_1$ and $d_2$ are geometrical thicknesses respectively of said transparent electrode 3 and thin dielectric layer 4. In this manner the present invention is featured by the presence of a thin dielectric layer for reducing the light reflected from the transparent electrodes, and such reduction of reflected light is achieved by selecting optimum amplitude and phase conditions for the components constituting the liquid crystal display device, i.e. the transparent substrate, transparent electrode, thin dielectric layer and liquid crystal, as will be explained below.

More specifically, according to the present invention, it has been discovered that optimum reflection prevention can be achieved by appropriate selection of the parameters of the above-mentioned components. Thus, if the refractive indexes of said components satisfy the following relations:

$$n_0 < n_1, \ n_2 < n_1, \text{ and } n_{LC} < n_2$$

satisfactory reflection prevention can be achieved by selecting the optical thicknesses $n_1 d_1$ and $n_2 d_2$ respectively of the transparent electrode and the thin dielectric layer in such a manner that they satisfy either one of the conditions from the first to fourth cases shown in the following:

First case: $n_1 d_1$ and $n_2 d_2$ satisfy the following conditions (1):

$$0.1 \times (2N_1 - 1)\lambda \leq n_1 d_1 \leq 0.15 \times (2N_1 - 1)\lambda$$

$$0.26 \times (2N_2 - 1)\lambda \leq n_2 d_2 \leq 0.39 \times (2N_2 - 1)\lambda \quad (1)$$

wherein $N_1$ and $N_2$ are arbitrary positive integers, and $\lambda$ is a design wavelength.

Figure 3:
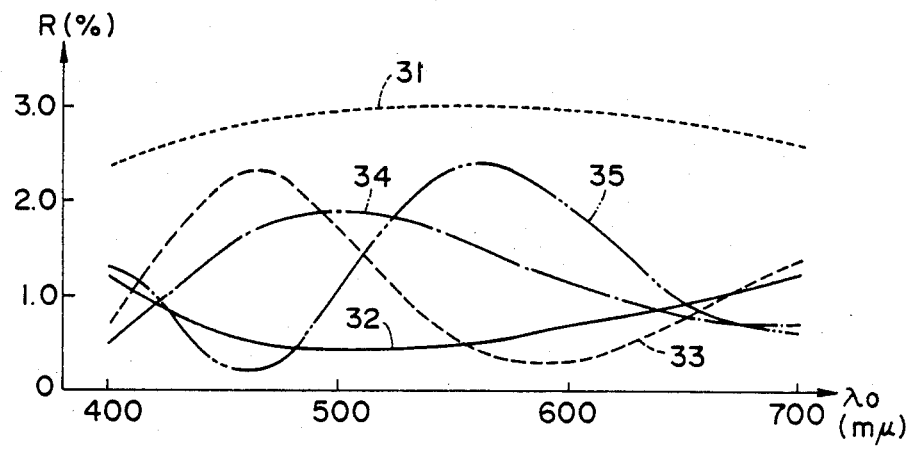
FIGS. 3 and 4 are spectral reflectance charts in the visible wavelength region of electrode plates embodying a first case of the present invention.

FIG. 3 shows the reflectance as the ordinate, as a function of wavelength as the abscissa, of examples of the above-described first-case embodiment. A curve 31 represents a conventional structure having transparent electrodes 3 alone on the transparent substrate 2, wherein $n_0 = 1.52$, $n_{LC} = 1.60$, $n_1 = 1.85$, $\lambda = 520$ m$\mu$ and $n_1 d_1 = \lambda/4 = 130$ m$\mu$. As is shown by said curve 31, the reflectance R from the transparent electrode in the conventional structure is in the range of 3.0% over the visible wavelength region from 380 to 760 m$\mu$. On the other hand, curves 32, 33, 34 and 35 represent the examples of the first case of the present invention, respectively corresponding to the following parameters, wherein $\lambda$ is 520 m$\mu$:

| Curve | $n_0$ | $n_1$ | $n_2$ | $n_{LC}$ | $n_1 d_1$ | $n_2 d_2$ |
|---|---|---|---|---|---|---|
| 32 | 1.52 | 1.85 | 1.75 | 1.60 | 65 m$\mu$ | 169 m$\mu$ |
| 33 | 1.52 | 1.85 | 1.75 | 1.60 | 65 | 507 |
| 34 | 1.52 | 1.85 | 1.75 | 1.60 | 195 | 169 |
| 35 | 1.52 | 1.85 | 1.75 | 1.60 | 195 | 507 |

The reflectance in the foregoing examples is maintained lower than 2.0% substantially over the entire visible wavelength range, and is lower than 1.0% in particular case of the curve 32.

Figure 4:
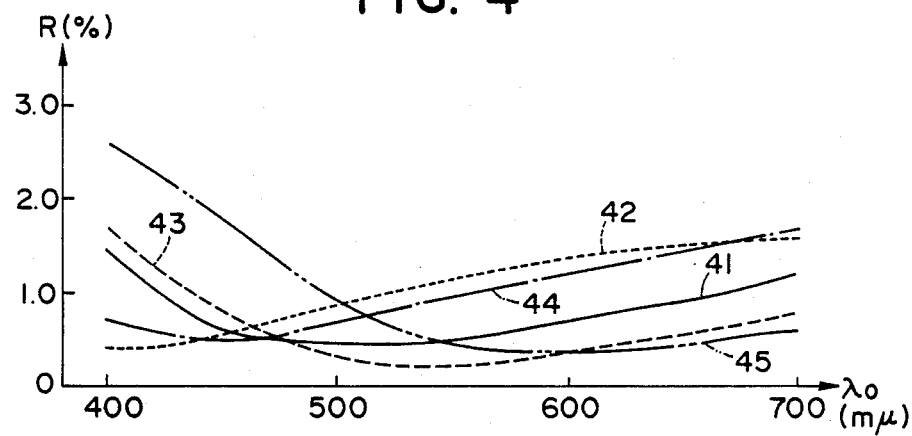

FIG. 4 shows reflectance curves for $\lambda = 520$ m$\mu$, $n_0 = 1.52$, $n_1 = 1.85$, $n_2 = 1.75$ and $n_{LC} = 1.60$, wherein however the values of $n_1 d_1$ and $n_2 d_2$ are calculated from the boundary values of the conditions (1) instead of the aforementioned values of $n_1 d_1 = \lambda/8 = 65$ m$\mu$ and $n_2 d_2 = 1.3\lambda/4 = 169$ m$\mu$. The values of $n_1 d_1$ and $n_2 d_2$ for each curve in FIG. 4 are as follows:

| Curve | 42 | 43 | 44 | 45 |
|---|---|---|---|---|
| $n_1 d_1$ | 52 m$\mu$ | 52 m$\mu$ | 78 m$\mu$ | 78 m$\mu$ |
| $n_2 d_2$ | 135 m$\mu$ | 203 m$\mu$ | 135 m$\mu$ | 203 m$\mu$ |

In FIG. 4, the curve 41 represents the case of basic optical thicknesses of $n_1 d_1 = 65$ m$\mu$ and $n_2 d_2 = 169$ m$\mu$. As can be seen from FIG. 4, satisfactory reflection prevention can be achieved as long as the values of $n_1 d_1$ and $n_2 d_2$ remain within ranges defined by the conditions (1).

Second case: $n_1 d_1$ and $n_2 d_2$ satisfy the following conditions (2):

$$0.2 \times (2N_1 - 1)\lambda \leq n_1 d_1 \leq 0.3 \times (2N_1 - 1)\lambda$$

$$0.2 \times (2N_2 - 1)\lambda \leq n_2 d_2 0.3 \times (2N_2 - 1)\lambda \quad (2)$$

wherein $N_1$ and $N_2$ are arbitrary positive integers, and $\lambda$ is a design wavelength.

Figure 5:
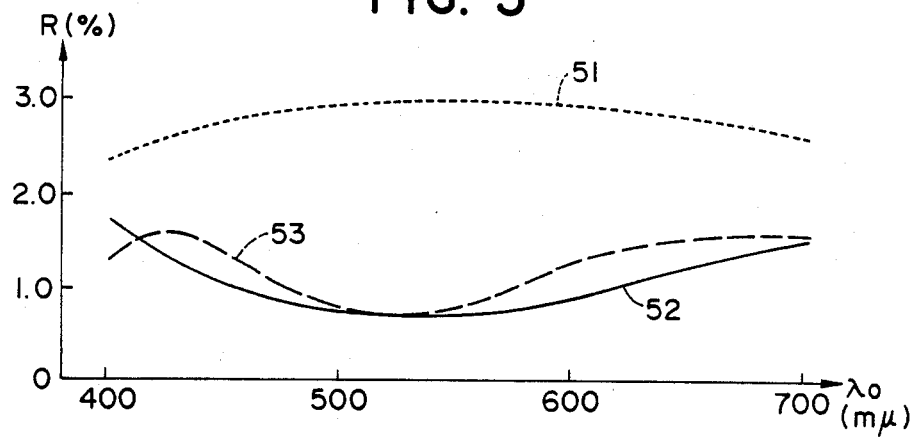
FIGS. 5 to 7 are spectral reflectance charts in the visible wavelength region of electrode plates embodying a second case of the present invention.

FIG. 5 shows the reflectance as the ordinate, as a function of wavelength as the abscissa, of examples of the above-mentioned second-case embodiment. A curve 51 represents a conventional structure having the transparent electrode 3 alone on the transparent substrate 2, wherein $n_0 = 1.52$, $n_{LC} = 1.60$, $n_1 = 1.85$ and $n_1 d_1 = 130$ m$\mu$ corresponding to $\lambda = 520$ m$\mu$ and $N_1 = 1$. As is shown by said curve 51, the conventional structure shows reflectance in the range of 3% over the entire visible wavelength region. On the other hand, a curve 52 shown in FIG. 5 represents the reflectance of a structure of the present invention obtained by providing a thin dielectric layer 4 on the transparent electrode 3 in the above-mentioned conventional structure represented by the curve 51. This embodiment has the parameters of $n_2 = 1.75$, and $n_2 d_2 = 130$ m$\mu$ corresponding to $\lambda = 520$ m$\mu$ and $N_2 = 1$. The presence of said thin dielectric layer 4 reduces the reflectance substantially to about 1%.

Also a curve 53 represents a structure the same as that corresponding to the curve 52, except that the transparent electrode 3 has an optical thickness of 390 m$\mu$ corresponding to $3\lambda/4$ ($\lambda=520$ m$\mu$). In this example the reflection preventive effect can be obtained if the transparent electrode 3 has an optical thickness $n_1d_1$ corresponding to an odd multiple of $\lambda/4$. Also the preventive effect can be obtained if the thin dielectric layer has an optical thickness $n_2d_2$ corresponding to an odd multiple of $\lambda/4$.

Figure 6:
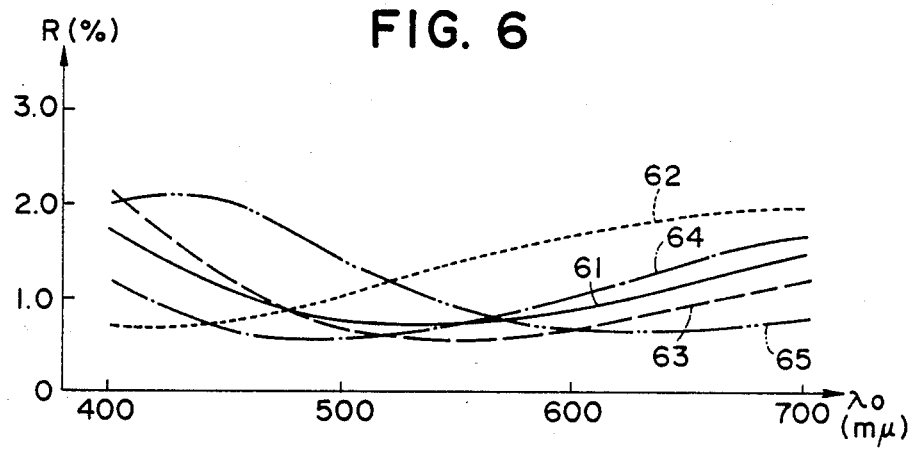

FIG. 6 shows reflectance curves for $\lambda=520$ m$\mu$, $n_0=1.52$, $n_1=1.85$, $n_2=1.75$ and $n_{LC}=1.60$, wherein however the values of $n_1d_1$ and $n_2d_2$ are calculated from the boundary values of the conditions (2) instead of the aforementioned values of $n_1d_1=n_2d_2=\lambda/4=130$ m$\mu$. The values of $n_1d_1$ and $n_2d_2$ for each curve shown in FIG. 6 are as follows:

| Curve | 62 | 63 | 64 | 65 |
|---|---|---|---|---|
| $n_1d_1$ | 104 m$\mu$ | 104 m$\mu$ | 156 m$\mu$ | 156 m$\mu$ |
| $n_2d_2$ | 104 m$\mu$ | 156 m$\mu$ | 104 m$\mu$ | 156 m$\mu$ |

In FIG. 6, the curve 61 represents the case of basic optical thicknesses of $n_1d_1=n_2d_2=130$ m$\mu$. As can be seen from FIG. 6, satisfactory reflection prevention can be achieved as long as the values of optical thicknesses $n_1d_1$ and $n_2d_2$ remain within the ranges defined by the conditions (2).

Figure 7:
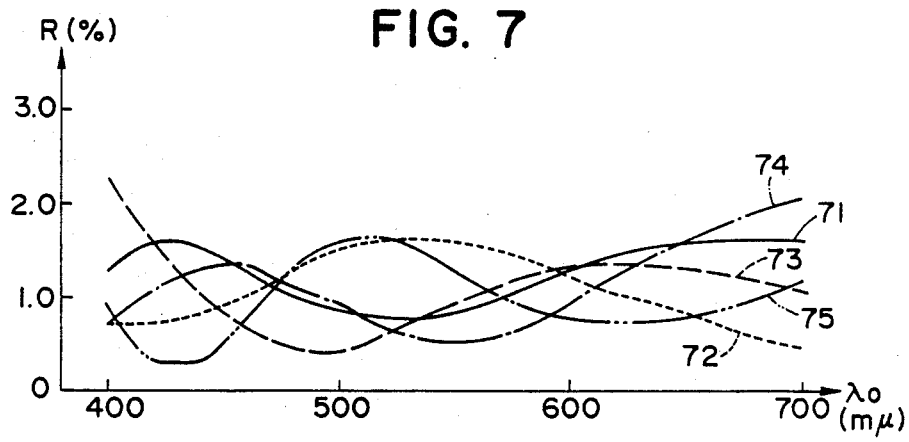

Also FIG. 7 shows reflectance curves for $\lambda=520$ m$\mu$, $n_0=1.52$, $n_1=1.85$, $n_2=1.75$ and $n_{LC}=1.60$, wherein however the values of $n_1d_1$ and $n_2d_2$ are calculated from the boundary values of the conditions (2) instead of the aforementioned values of $n_1d_1=3\lambda/4=390$ m$\mu$ and $n_2d_2=\lambda/4=130$ m$\mu$. The values of $n_1d_1$ and $n_2d_2$ for each curve are as follows:

| Curve | 72 | 73 | 74 | 75 |
|---|---|---|---|---|
| $n_1d_1$ | 312 m$\mu$ | 312 m$\mu$ | 468 m$\mu$ | 468 m$\mu$ |
| $n_2d_2$ | 104 m$\mu$ | 156 m$\mu$ | 104 m$\mu$ | 156 m$\mu$ |

In FIG. 7, the curve 71 represents the case of basic optical thicknesses of $n_1d_1=390$ m$\mu$ and $n_2d_2=130$ m$\mu$. As can be seen from FIG. 7, satisfactory reflection prevention can be achieved as long as the values of optical thicknesses $n_1d_1$ and $n_2d_2$ remain within the ranges defined by the conditions (2).

Third case: $n_1d_1$ and $n_2d_2$ satisfy the following conditions (3):

$$0.4 \times N_1\lambda \leq n_1d_1 \leq 0.6 \times N_1\lambda$$

$$0.2 \times N_2\lambda \leq n_2d_2 \leq 0.3 \times N_2\lambda \qquad (3)$$

wherein $N_1$ and $N_2$ are arbitrary positive integers, and $\lambda$ is a design wavelength.

FIG. 8 shows the reflectance as the ordinate, as a function of wavelength as the abscissa, of examples of the above-mentioned third-case embodiment. A curve 81 represents a conventional structure having the transparent electrode 3 alone on the transparent substrate 2, wherein $n_0=1.52$, $n_{LC}=1.60$, $n_1=1.85$, $\lambda=520$ m$\mu$ and $n_1d_1=\lambda/4=130$ m$\mu$. As is shown by said curve 81, the conventional structure has a reflectance R in the range of 3.0% over the visible wavelength region of 380 to 760 m$\mu$. On the other hand other curves 82, 83 and 84 shown in FIG. 8 represent the examples of the present invention. A structure corresponding to the curve 82 has parameters of $n_0=1.52$, $n_1=1.85$, $n_2=1.75$, $n_{LC}=1.60$, $\lambda=520$ m$\mu$, $n_1d_1=\lambda/2=260$ m$\mu$ and $n_2d_2=\lambda/4=130$ m$\mu$ and achieves a reflectance in the order of 1%. A structure corresponding to the curve 83 is the same as that of the curve 82, except that $n_2d_2$ is changed to $\lambda/2=260$ m$\mu$, and achieves a reflectance essentially lower than 2%. Also a structure corresponding to the curve 84 shown in FIG. 8 is the same as that of the curve 82, except that $n_2d_2$ is changed to $3\lambda/4=390$ m$\mu$ and achieves a reflectance in the order of 1%.

FIG. 9 shows reflectance curves for $\lambda=520$ m$\mu$, $n_0=1.52$, $n_1=1.85$, $n_2=1.75$ and $n_{LC}=1.60$, wherein however the values of $n_1d_1$ and $n_2d_2$ are calculated from the boundary values of the conditions (3) instead of the aforementioned values of $n_1d_1=\lambda/2$ and $n_2d_2=\lambda/4$. The values of $n_1d_1$ and $n_2d_2$ for each curve are as follows:

| Curve | 92 | 93 | 94 | 95 |
|---|---|---|---|---|
| $n_1d_1$ | 208 m$\mu$ | 208 m$\mu$ | 312 m$\mu$ | 312 m$\mu$ |
| $n_2d_2$ | 104 m$\mu$ | 156 m$\mu$ | 104 m$\mu$ | 156 m$\mu$ |

In FIG. 9, the curve 91 corresponds to the case of basic optical thicknesses of $n_1d_1=\lambda/2=260$ m$\mu$ and $n_2d_2=\lambda/4=130$ m$\mu$.

FIG. 10 shows reflectance curves for $\lambda=520$ m$\mu$, $n_0=1.52$, $n_1=1.85$, $n_2=1.75$ and $n_{LC}=1.60$, wherein however the values of $n_1d_1$ and $n_2d_2$ are calculated from the boundary values of the conditions (3) instead of the aforementioned values of $n_1d_1=\lambda/2$ and $n_2d_2=\lambda/2$. The values of $n_1d_1$ and $n_2d_2$ for each curve are as follows:

| Curve | 102 | 103 | 104 | 105 |
|---|---|---|---|---|
| $n_1d_1$ | 208 m$\mu$ | 208 m$\mu$ | 312 m$\mu$ | 312 m$\mu$ |
| $n_2d_2$ | 208 m$\mu$ | 312 m$\mu$ | 208 m$\mu$ | 312 m$\mu$ |

In FIG. 10, the curve 101 corresponds to a case of basic optical thicknesses of $n_1d_1=n_2d_2=\lambda/2=260$ m$\mu$.

Figure 11:
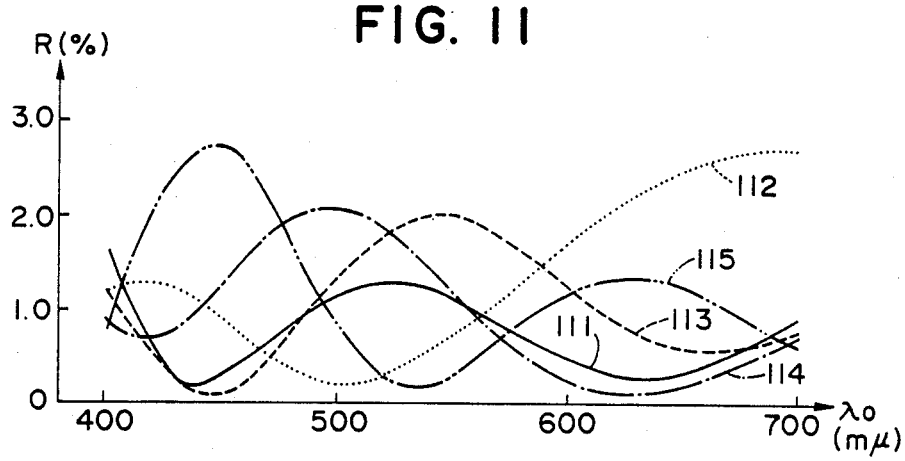

FIG. 11 shows reflectance curves for $\lambda=520$ m$\mu$, $n_0=1.52$, $n_1=1.85$, $n_2=1.75$ and $n_{LC}=1.60$, wherein however the values of $n_1d_1$ and $n_2d_2$ are calculated from the boundary values of the conditions (3) instead of the aforementioned values of $n_1d_1=\lambda/2$ and $n_2d_2=3\lambda/4$. The values of $n_1d_1$ and $n_2d_2$ for each curve are as follows:

| Curve | 112 | 113 | 114 | 115 |
|---|---|---|---|---|
| $n_1d_1$ | 208 m$\mu$ | 208 m$\mu$ | 312 m$\mu$ | 312 m$\mu$ |
| $n_2d_2$ | 312 m$\mu$ | 468 m$\mu$ | 312 m$\mu$ | 468 m$\mu$ |

In FIG. 11, the curve 111 corresponds to the case of basic optical thicknesses of $n_1d_1=\lambda/2=260$ m$\mu$ and $n_2d_2=3\lambda/4=390$ m$\mu$.

As shown in FIGS. 9, 10 and 11, satisfactory reflection prevention can be achieved as long as the values of $n_1d_1$ and $n_2d_2$ remain in the ranges defined by the conditions (3).

Fourth case: $n_1d_1$ and $n_2d_2$ satisfy the following conditions (4):

$$0.1 \times (2N_1-1)\lambda \leq n_1d_1 \leq 0.15 \times (2N_1-1)\lambda$$

$$0.4 \times N_2\lambda \leq n_2d_2 \leq 0.6 \times N_2\lambda \qquad (4)$$

wherein $N_1$ and $N_2$ are arbitrary positive integers, and $\lambda$ is a design wavelength.

Figure 12:
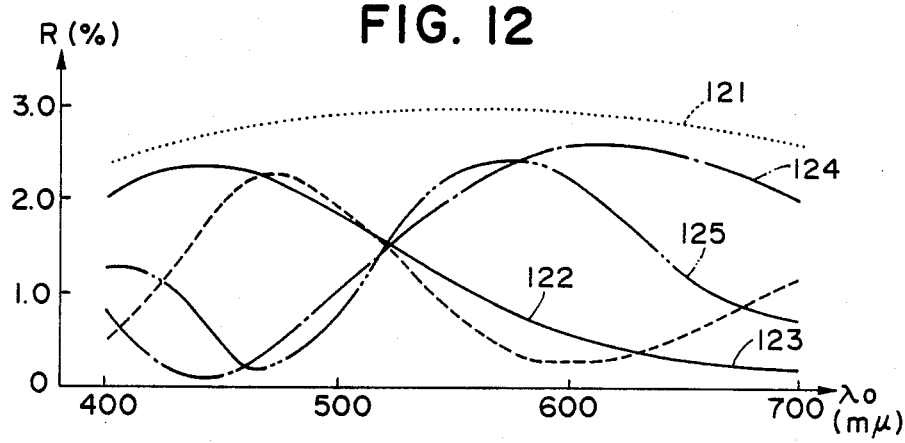
FIGS. 12 and 13 are spectral reflectance charts in the visible wavelength region of electrode plates embodying a fourth case of the present invention.

FIG. 12 shows the reflectance as the ordinate, as a function of wavelength as the abscissa, of examples of the above-mentioned fourth-case embodiment. A curve 121 represents a conventional structure having the transparent electrode 3 alone on the transparent substrate 2, wherein $n_0 = 1.52$, $n_{LC} = 1.60$, $n_1 = 1.85$, $\lambda = 520$ m$\mu$ and $n_1 d_1 = \lambda/4 = 130$ m$\mu$. As is shown by said curve 121, the conventional structure has a reflectance R in the range of 3.0% over the visible wavelength region of 380 to 760 m$\mu$. Other curves 122, 123, 124 and 125 shown in FIG. 12 represent the examples of the present invention and have following parameters, wherein $\lambda$ is equal to 520 m$\mu$:

| Curve | $n_0$ | $n_1$ | $n_2$ | $n_{LC}$ | $n_1 d_1$ | $n_2 d_2$ |
| --- | --- | --- | --- | --- | --- | --- |
| 122 | 1.52 | 1.85 | 1.75 | 1.60 | 65 m$\mu$ | 260 m$\mu$ |
| 123 | 1.52 | 1.85 | 1.75 | 1.60 | 65 | 520 |
| 124 | 1.52 | 1.85 | 1.75 | 1.60 | 195 | 260 |
| 125 | 1.52 | 1.85 | 1.75 | 1.60 | 195 | 520 |

In these examples the reflectance is reduced essentially below 2.5% over the entire visible wavelength region.

Figure 13:
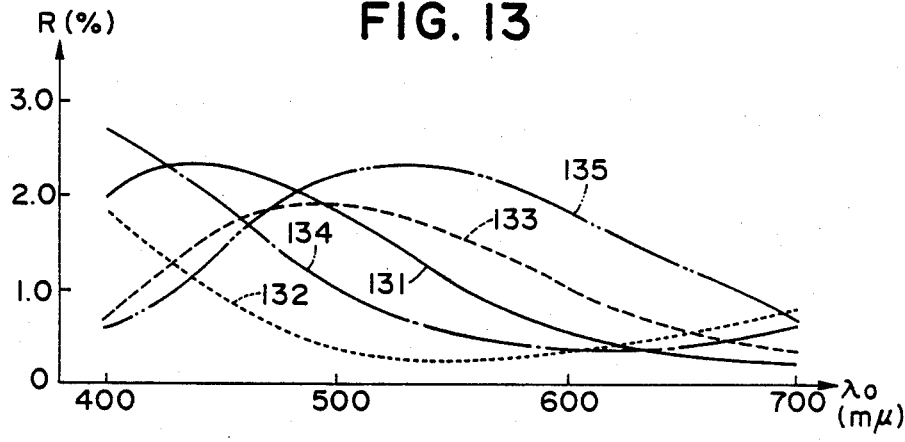

FIG. 13 shows reflectance curves for $\lambda = 520$ m$\mu$, $n_0 = 1.52$, $n_1 = 1.85$, $n_2 = 1.75$ and $n_{LC} = 1.60$, wherein however the values of $n_1 d_1$ and $n_2 d_2$ are calculated from the boundary values of the conditions (4) instead of the aforementioned values of $n_1 d_1 = \lambda/8 = 65$ m$\mu$ and $n_2 d_2 = \lambda/2 = 260$ m$\mu$. The values of $n_1 d_1$ and $n_2 d_2$ for each curve are as follows:

| Curve | 132 | 133 | 134 | 135 |
| --- | --- | --- | --- | --- |
| $n_1 d_1$ | 52 m$\mu$ | 52 m$\mu$ | 78 m$\mu$ | 78 m$\mu$ |
| $n_2 d_2$ | 208 m$\mu$ | 312 m$\mu$ | 208 m$\mu$ | 312 m$\mu$ |

In FIG. 13, the curve 131 corresponds to the case of basic optical thicknesses of $n_1 d_1 = 65$ m$\mu$ and $n_2 d_2 = 260$ m$\mu$. As can be seen from FIG. 13, satisfactory reflection prevention can be achieved as long as the values of $n_1 d_1$ remain in the ranges defined by the conditions (4).

Now, if the refractive indexes of the components constituting the electrode plate satisfy the following relations:

$$n_0 < n_1, \ n_2 < n_1 \text{ and } n_2 \leq n_{LC}$$

satisfactory reflection prevention can be achieved by selecting the optical thicknesses $n_1 d_1$ and $n_2 d_2$ respectively of the transparent electrode and thin dielectric layer in such a manner that they satisfy either one of the conditions from the fifth to seventh cases shown as follows.

Fifth case: $n_1 d_1$ and $n_2 d_2$ substantially satisfy the following conditions (5):

$$n_1 d_1 = (2N_1 - 1) \times \lambda/4$$

$$n_2 d_2 = N_2 \times \lambda/2 \tag{5}$$

wherein $N_1$ and $N_2$ are arbitrary positive integers, and $\lambda$ is a design wavelength.

Figure 14:
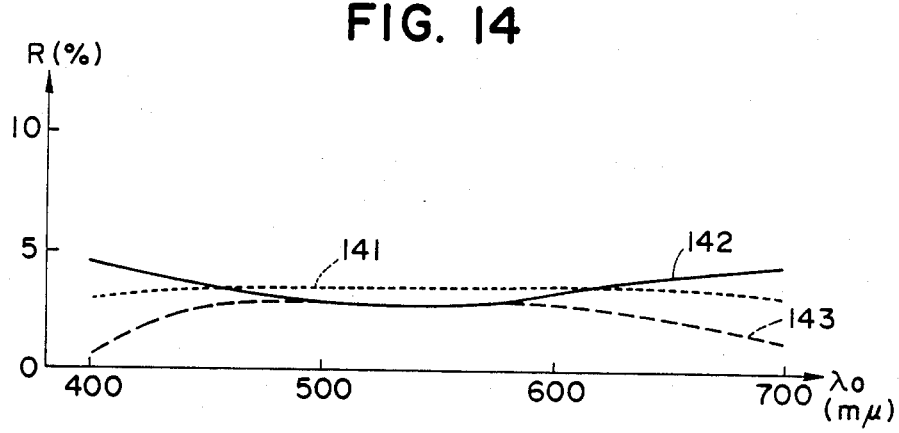
FIG. 14 is a spectral reflectance chart in the visible wavelength region of electrode plates embodying a fifth case of the present invention.

FIG. 14 shows the reflectance as the ordinate, as a function of wavelength as the abscissa, of examples of the above-mentioned fifth-case embodiment. A curve 141 represents a conventional structure with parameters of $\lambda = 520$ m$\mu$, $n_0 = 1.52$, $n_1 = 1.85$, $n_{LC} = 1.60$ and $n_1 d_1 = \lambda/4 = 130$ m$\mu$. As is shown by said curve 141, the conventional structure has a reflectance R in the range of 3.0% over the visible wavelength region of 380 to 760 m$\mu$. Other curves 142 and 143 shown in FIG. 14 represent the examples of the present invention and have the following parameters, wherein $\lambda$ is equal to 520 m$\mu$:

| Curve | $n_0$ | $n_1$ | $n_2$ | $n_{LC}$ | $n_1 d_1$ | $n_2 d_2$ |
| --- | --- | --- | --- | --- | --- | --- |
| 142 | 1.52 | 1.85 | 1.48 | 1.60 | 130 m$\mu$ | 260 m$\mu$ |
| 143 | 1.52 | 1.85 | 1.48 | 1.60 | 390 | 260 |

The curve 142 of the present invention has a lower reflectance, in comparison with the reflectance 141 of the conventional structure, in a wavelength region from 450 to 620 m$\mu$, corresponding to green light highly sensitive to human eyes. Consequently the reduction in reflection in this wavelength region is seen by human eyes as a significant decrease of reflection from the transparent electrode.

Also the curve 143 of the present invention is different from the above-mentioned curve 142 in that the value of $n_1 d_1$ is changed to $3\lambda/4 = 390$ m$\mu$, with corresponding further improvement.

Sixth case: $n_1 d_1$ and $n_2 d_2$ substantially satisfy the following conditions (6):

$$n_1 d_1 = N_1 \times \lambda/2$$

$$n_2 d_2 = N_2 \times \lambda/4 \tag{6}$$

wherein $N_1$ and $N_2$ are arbitrary positive integers, and $\lambda$ is a design wavelength.

Figure 15:
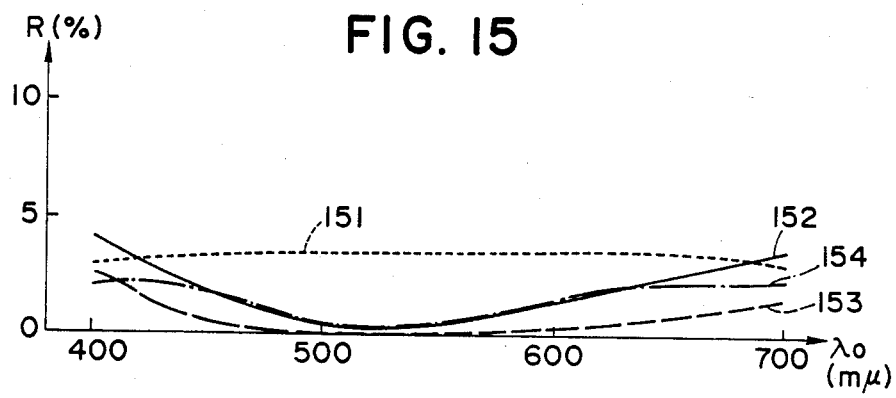
FIG. 15 is a spectral reflectance chart in the visible wavelength region of electrode plates embodying a sixth case of the present invention.

FIG. 15 shows the reflectance as the ordinate, as a function of wavelength as the abscissa, of the examples of the above-mentioned sixth-case embodiment. A curve 151 represents a conventional structure with parameters of $n_0 = 1.52$, $n_1 = 1.85$, $n_{LC} = 1.60$, $\lambda = 520$ m$\mu$ and $n_1 d_1 = \lambda/4 = 130$ m$\mu$. As is shown by said curve 151, the conventional structure has a reflectance R in the range of 3.0% over the visible wavelength region of 380 to 760 m$\mu$. Other curves 152, 153 and 154 shown in FIG. 15 represent the examples of the present invention and have following parameters:

| Curve | $n_0$ | $n_1$ | $n_2$ | $n_{LC}$ | $n_1 d_1$ | $n_2 d_2$ |
| --- | --- | --- | --- | --- | --- | --- |
| 152 | 1.52 | 1.85 | 1.48 | 1.60 | 260 m$\mu$ | 130 m$\mu$ |
| 153 | 1.52 | 1.85 | 1.48 | 1.60 | 260 | 260 |
| 154 | 1.52 | 1.85 | 1.48 | 1.60 | 260 | 260 |

As shown in FIG. 15, the structures of the present invention corresponding to the curves 152, 153 and 154 show significantly lower reflectance in comparison with the conventional structure represented by the curve 151, particularly in the green wavelength region of higher visual sensitivity, where the reflectance is less than 1%.

The examples shown in FIG. 15 have $n_2 d_2$ values different in multiples, but similar reflection preventive effect can be obtained if $n_1 d_1$ is equal to multiples of $\lambda/2$.

Seventh case: $n_1 d_1$ and $n_2 d_2$ substantially satisfy the following conditions (7):

$$n_1 d_1 = \lambda/8$$

$$n_2 d_2 = N_2/2 \times \lambda \tag{7}$$

wherein $N_2$ is arbitrary positive integer and $\lambda$ is a design wavelength.

Figure 16:
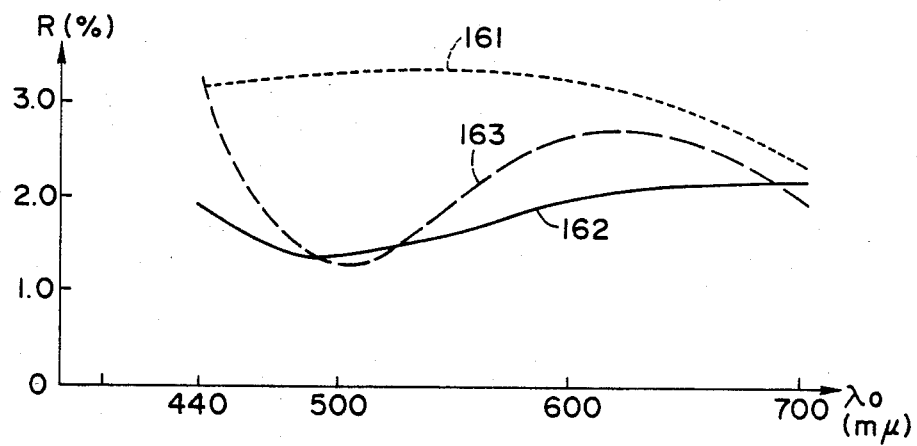
FIG. 16 is a spectral reflectance chart in the visible wavelength region of electrode plates embodying a seventh case of the present invention.

FIG. 16 shows the reflectance as ordinate, as a function of wavelength as abscissa, of the examples of the above-mentioned seventh-case embodiment. A curve 161 in FIG. 16 shows the reflectance in the conventional structure with parameters of $\lambda=520$ m$\mu$, $n_0=1.52$, $n_1=1.85$, $n_{LC}=1.60$ and $n_1d_1=\lambda/4=130$ m$\mu$. As can be seen from the curve 161, the conventional structure has a reflectance R in the range of 3.0% over the visible wavelength region. Other curves 162 and 163 shown in FIG. 16 represent examples of the present invention and have the following parameters, wherein $\lambda$ is equal to 520 m$\mu$:

| Curve | $n_0$ | $n_1$ | $n_2$ | $n_{LC}$ | $n_1d_1$ | $n_2d_2$ |
|---|---|---|---|---|---|---|
| 162 | 1.52 | 1.85 | 1.48 | 1.60 | 65 m$\mu$ | 260 m$\mu$ |
| 163 | 1.52 | 1.85 | 1.48 | 1.60 | 65 | 520 |

As shown in FIG. 16, it will be evident that the structures of the present invention provide reduced reflectance over substantially the entire visible wavelength region.

In the aforementioned liquid crystal display device, the transparent substrate 2 may be provided with a protective coating of an inorganic material having a refractive index equal to or substantially equal to that $n_0$ of said substrate, and, with such protective coating the substrate can be still regarded optically as a transparent substrate with refractive index $n_0$ and without change in reflectance. Thus, in case where transparent substrate is composed of glass, it is desirable to coat the surfaces thereof with an inorganic material having substantially the same refractive index as that of said glass, in order to prevent deterioration of the liquid crystal by alkali ions generally contained in the glass. For example if the transparent substrate is composed of glass having a refractive index of 1.52, it is desirable to coat the surface thereof with transparent silica having a refractive index equal to about 1.48.

As examples of the materials suitable for use in the present invention, the transparent substrate can be composed of glass such as soda lime glass, barium crown glass, barium flint glass, heavy barium crown glass or heavy flint glass, or of plastic materials such as polymethyl methacrylate, polyester resin, polystyrene resin or polycarbonate resin. Also the transparent electrode 3 can be composed of $In_2O_3$ or $SnO_2$, the thin dielectric layer 4 can be composed of $SiO_2$, $MgF_2$, a silane, SiO, $Al_2O_3$, polyimide resin, polyamide-imide resin, or the like, and the liquid crystal 5 can be composed of a nematic liquid crystal material.

Said transparent electrode 3 and the dielectric layer 4 can be deposited for example by vacuum evaporation, sputtering, ion plating, dip coating, spinner coating, CVD method etc.

As explained in the foregoing, the liquid crystal device of the present invention reduces the amount of light reflected by the transparent electrode in a simple method, thus improving the image quality and contrast.

What I claim is:

1. A liquid crystal device having a reflection preventing function, comprising:
   a liquid crystal material; and
   two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$n_0 < n_1$, $n_2 < n_1$, and $n_{LC} < n_2$, wherein $n_1d_1$ and $n_2d_2$ are so selected as to satisfy the following relations:

$0.1 \times (2N_1-1)\lambda \leq n_1d_1 \leq 0.15 \times (2N_1-1)\lambda$ $0.26 \times (2N_2-1)\lambda \leq n_2d_2 \leq 0.39 \times (2N_2-1)\lambda$ wherein $\lambda$ is a design wavelength, and $N_1$ and $N_2$ are arbitrary positive integers.

2. A liquid crystal device having a reflection preventing function, comprising:
   a liquid crystal material; and
   two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$n_0 < n_1$, $n_2 < n_1$, and $n_{LC} < n_2$ wherein $n_1d_1$ and $n_2d_2$ are so selected as to satisfy the following relations:

$0.2 \times (2N_1-1)\lambda \leq n_1d_1 \leq 0.3 \times (2N_1-1)\lambda$ $0.2 \times (2N_2-1)\lambda \leq n_2d_2 \leq 0.3 \times (2N_2-1)\lambda$ wherein $\lambda$ is a design wavelength, and $N_1$ and $N_2$ are arbitrary positive integers.

3. A liquid crystal device having a reflection preventing function, comprising:
   a liquid crystal material; and
   two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$n_0 < n_1$, $n_2 < n_1$, and $n_{LC} < n_2$ wherein $n_1d_1$ and $n_2d_2$ are so selected as to satisfy the following relations:

$$0.4 \times N_1 \lambda \leq n_1 d_1 \leq 0.6 \times N_1 \lambda$$

$$0.2 \times N_2 \lambda \leq n_2 d_2 \leq 0.3 \times N_2 \lambda$$

wherein $\lambda$ is a design wavelength, and $N_1$ and $N_2$ are arbitrary positive integers.

4. A liquid crystal device having a reflection preventing function, comprising:

a liquid crystal material; and two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$$n_0 < n_1, \; n_2 < n_1, \; \text{and} \; n_{LC} < n_2$$

wherein $n_1 d_1$ and $n_2 d_2$ are so selected as to satisfy the following relations:

$$0.1 \times (2N_1 - 1)\lambda \leq n_1 d_1 \leq 0.15 \times (2N_1 - 1)\lambda$$

$$0.4 \times N_2 \lambda \leq n_2 d_2 \leq 0.6 \times N_2 \lambda$$

wherein $\lambda$ is a design wavelength, and $N_1$ and $N_2$ are arbitrary

5. A liquid crystal device having a reflection preventing function, comprising:

a liquid crystal material; and two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$$n_0 < n_1, \; n_2 < n_1, \; \text{and} \; n_2 \leq n_{LC}$$

wherein $n_1 d_1$ and $n_2 d_2$ are so selected as to substantially satisfy the following relations:

$$n_1 d_1 = (2N_1 - 1) \times \lambda/4$$

$$n_2 d_2 = N_2 \times \lambda/2$$

wherein $\lambda$ is a design wavelength, and $N_1$ and $N_2$ are arbitrary positive integers.

6. A liquid crystal device having a reflection preventing function, comprising:

a liquid crystal material; and two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $x_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$$n_0 < n_1, \; n_2 < n_1, \; \text{and} \; n_2 \leq n_{LC}$$

wherein $n_1 d_1$ and $n_2 d_2$ are so selected as to substantially satisfy the following relations:

$$n_1 d_1 = N_1 \times \lambda/4$$

$$n_2 d_2 = N_2 \times \lambda/4$$

wherein $\lambda$ is a design wavelength, and $N_1$ and $N_2$ are arbitrary positive integers.

7. A liquid crystal device having a reflection preventing function, comprising a liquid crystal material; and two electrode plates positioned to sandwich said liquid crystal material therebetween; at least one of said electrode plates including a transparent substrate, a transparent electrode provided on said transparent substrate, and a dielectric layer provided on said transparent electrode; said transparent substrate having a refractive index $n_0$, said transparent electrode having a refractive index $n_1$ and a geometrical thickness $d_1$, said dielectric layer having a refractive index $n_2$ and a geometrical thickness $d_2$ and said liquid crystal material having a refractive index $n_{LC}$ satisfying the relations:

$$n_0 < n_1, \; n_2 < n_1, \; \text{and} \; n_2 \leq n_{LC}$$

wherein $n_1 d_1$ and $n_2 d_2$ are so selected as to substantially satisfy the following relations:

$$n_1 d_1 = \lambda/8$$

$$n_2 d_2 = N/2 \times \lambda$$

wherein $\lambda$ is a design wavelength, and $N$ is a positive integer.

* * * * *

UNITED STATES PATENT AND TRADEMARK OFFICE
CERTIFICATE OF CORRECTION

PATENT NO. : 4,505,547
DATED : March 19, 1985
INVENTOR(S) : NOBUYUKI SEKIMURA

It is certified that error appears in the above-identified patent and that said Letters Patent is hereby corrected as shown below:

Column 5, line 50, after "0.2 X $N_2$" insert -- $\lambda$ --.

Column 9, line 1, after "$N_2$ is" insert --an--.

Column 11, line 33, after "arbitrary" insert --positive integers.--.

Column 12, line 13, change "$X_0$" to --$n_0$--.

Signed and Sealed this

Twenty-ninth Day of July 1986

[SEAL]

Attest:

DONALD J. QUIGG

Attesting Officer

Commissioner of Patents and Trademarks